United States Patent [19]
Apitz

[11] 3,711,686
[45] Jan. 16, 1973

[54] TRAFFIC VOLUME COMPUTER

[75] Inventor: Peter F. Apitz, Fullerton, Calif.

[73] Assignee: Tamar Electronics, Inc., Anaheim, Calif.

[22] Filed: June 8, 1971

[21] Appl. No.: 151,093

[52] U.S. Cl........235/150.24, 235/92 TC, 340/31 A, 340/38 R
[51] Int. Cl..............................................G06f 15/48
[58] Field of Search..........235/150.2, 150.24, 92 TC; 340/31 R, 31 A, 38 R, 39; 343/8, 112 TC; 307/226, 220

[56] References Cited

UNITED STATES PATENTS

| | | | |
|---|---|---|---|
| 3,315,065 | 4/1967 | Auer, Jr. | 235/150.24 |
| 3,446,947 | 5/1969 | Overstreet, Jr. | 307/220 X |
| 3,345,503 | 10/1967 | Auer, Jr. | 235/150.24 |
| 3,397,305 | 8/1968 | Auer, Jr. | 235/150.24 |
| 3,506,808 | 4/1970 | Riddle, Jr. et al. | 235/150.24 |
| 3,389,244 | 6/1968 | Brockett | 235/150.24 |
| 3,456,200 | 7/1969 | Bos | 307/226 X |

Primary Examiner—Malcolm A. Morrison
Assistant Examiner—Jerry Smith
Attorney—Sokolski & Wohlgemuth

[57] ABSTRACT

The output of a vehicle detector which provides an indication for each vehicle passing a point on a roadway is multiplied by an appropriate scaling factor. This scaled signal is then divided by factors in accordance with a predetermined sample cycle length and the number of sampling cycles used to form a complete sampling period. The signal so derived is then divided by a selected scale factor which represents a standard or reference vehicle volume per unit of time. A signal is thus derived which represents the volume of traffic per unit of time as a percentage of the selected standard or reference volume, this information being digitally accumulated during each sampling period and read out for display or use in computing circuits.

13 Claims, 10 Drawing Figures

INVENTOR
PETER F. APITZ

BY

SOKOLSKI & WOHLGEMUTH

ATTORNEYS

TRAFFIC VOLUME COMPUTER

This invention relates to traffic control equipment, and more particularly to a computer for determining the volume of traffic flow during successive sampling periods.

In implementing traffic control systems, an important measurement utilized is one as to the volume of traffic on a roadway. Such information is used to provide an immediate indication to traffic control engineers, may be recorded for statistical purposes, or may be utilized in appropriate computing circuitry to adjust the traffic control system to adapt it to changing traffic conditions. The use of such measurements along the last mentioned lines in a digital traffic control system is described, for example, in U.S. Pat. No. 3,414,876.

In the traffic density implementation of this patent, a digital signal is derived which is merely in accordance with the volume of traffic over a predetermined time period. While this type of simple measurement is useful in implementing control functions, it does not have the accuracy to be desired, nor does it provide a comparison with a predetermined standard traffic flow so as to furnish accurate criteria for evaluating the volume of traffic at the measurement location.

The system of this invention provides means for continuously accurately measuring traffic volume during relatively short successive sampling periods and providing an output indicating each of such successive measurements as a percentage of a standard or reference volume. Such computations are fully digitally implemented. Further, means are provided to select any one of a number of standard or reference volumes for comparison in determining the percentage volume measurement. Further, the information is constantly being updated by virtue of successive measurements made during relatively short sampling periods.

It is therefore the principal object of this invention to facilitate the accurate computation of traffic volume for use in traffic control functions.

It is a further object of this invention to provide a traffic volume computer which provides traffic volume measure-ments in terms of a percentage of a standard volume.

It is still a further object of this invention to provide a highly accurate digital traffic volume computer which provides continually updated information obtained during successive sampling periods.

It is still another object of this invention to provide a traffic control volume computer in which measurements are made against a standard volume which can be preset to any one of a number of values.

Other objects of this invention will become apparent as the description proceeds in connection with the accompanying drawings, of which:

Figure 1:
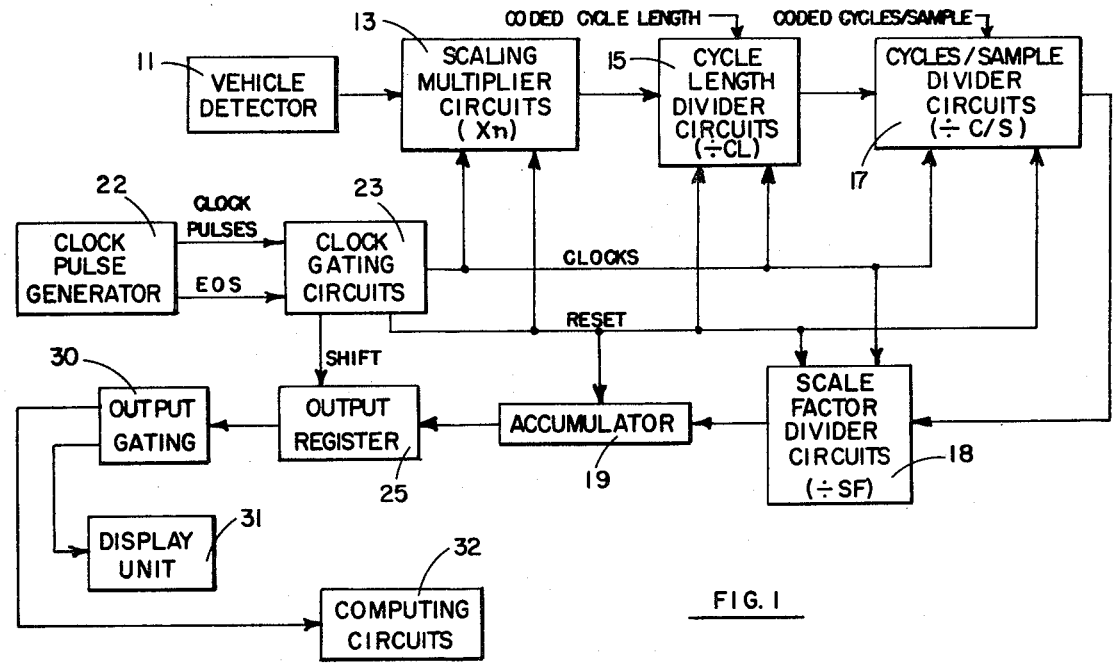
FIG. 1 is an overall functional block diagram of the system of the invention.

Briefly described, the computer of the invention involves the processing of the output of a vehicle detector which represents the number of vehicles passing a point on a roadway to provide a digital signal in accordance with the traffic volume during successive sampling periods, this signal being represented as a percentage of a selected standard volume. This computation is implemented as follows:

The output of the vehicle detector is first scaled by a predetermined multiplication factor used to simplify the computation. The output of the multiplier is then successively divided by factors in accordance with the length of each sample cycle and the number of sample cycles forming each sampling period. This output signal is then effectively compared with a selected scale factor representing the reference or standard vehicle volume by dividing by this scale factor to provide an output as a percentage thereof. The digital signal so derived is fed to an accumulator and at the end of each sampling period the accumulated signal is shifted through an output register either for display or use in computing circuitry.

To facilitate the understanding of the operation of the computer of this invention it is helpful to look at the following equation which represents the computer implementation:

$$SV(\text{percent}) = \frac{Vs \times 3600 \text{ (sec./hour)} \times 100\%}{CL \times C/S \times SF} \quad (1)$$

Where
$SV$ = Scaled Volume as a percentage
$Vs$ = Number of actuations within one sample period
$CL$ = Cycle length in seconds
$C/S$ = Cycles Sample
$S/F$ = Scale Factor, or standard, in Veh/Hr.

As an example, let us assume that the cycle length is 60 seconds, the number of cycles in each sampling period is four, and the standard or reference scale factor is 900 vehicles per hour. Then if exactly 30 vehicle actuations are received during a sampling period, the scaled volume will be equal to 50 percent. This answer tells us that with 30 actuations received during a sampling period of 240 seconds, the measured volume is 450 vehicles per hour, which is 50 percent of the 900 vehicle per hour scale factor. As already noted, the scale factor can be set to any desired amount which is deemed desirable for the particular traffic conditions involved.

Let us now see how a convenient scaling multiplier factor may be derived. It is to be noted by examination of Equation (1) that the factors in the numerator are either constants or cannot be controlled (Vs falling within the latter category). Let us assume cycle length ranges between 5 and 155 seconds, cycles/sample between one and five, and scale factor from 100 to 3900 vehicles per hour. Then, $CL = 5$ sec, $C/S = 1$, and $SF = 100$ vehicles per hour, will always result in the largest scale volume percentage for any number of actuations within a given sample period. Inserting these values into the volume equation produces the following:

$$SV(\text{percent}) = \frac{Vs \text{ vehicles} \times 3600 \text{ sec./hour} \times 100\%}{5 \text{ sec.} \times 1 \times 100 \text{ veh./hour}} \quad (2)$$

Solving Equation (2) produces the following:

$$SV\% = Vs \times 720 \quad (3)$$

obtain ½% resolution, the factor of Equation (3) is doubled to provide a multiplier of 1440. Thus, in this manner, a convenient multiplier for facilitating the computations in digital counting circuitry is derived.

Referring now to FIG. 1, a functional block diagram of the system of the invention is shown. Vehicle detector 11, which is located along the roadway to be monitored, generates output pulses in accordance with the number of vehicles sensed thereby. These output pulses are fed to scaling multiplier 13 where they are multiplied by a convenient scaling factor ($n$) which in the illustrative example described above is 1440. The output of scaling multiplier 13 is fed to cycle length divider circuits 15 where the digital output is divided by a factor which is in accordance with a predetermined length of the sampling cycle in seconds. The output of cycle length divider circuits 15 is fed to cycles/sample divider circuits 17, where it is divided by an additional factor which is in accordance with the number of sampling cycles in a sampling period. The output of cycle sample divider 17 is fed to scale factor divider circuits 18, where it is divided by a selected scale factor presenting the standard or reference vehicle volume with which the measured volume is to be compared.

The digital output of scale factor divider circuits represents the percentage of the scale factor or standard vehicle volume which the measured vehicle volume constitutes. This digital signal is fed to accumulator 19 where it is accumulated over the sampling period.

Clock pulses for controlling the various operations are provided from clock pulse generator 22 to clock gating circuits 23. The clock pulses are distributed from clock gating circuits 23 to multiplier 13 and dividers 15-18 to synchronously control the operation thereof.

The accumulated count in accumulator 19 is registered on output register 25. At the end of the sampling period, an end of sampling pulse (EOS) is fed from clock pulse generator 22 to clock gating circuits 23 which provides a parallel shift signal to output register 35 to shift the accumulated count of accumulator 19 through output gating 30 for display on display unit 31 and/or utilization in computing circuits 32. Immediately after the shift signal has been fed to the output register, a reset signal is provided from the clock gating circuits to reset accumulator 19 as well as dividers 15-18 and multiplier 13. The various circuits are thus ready for a new sampling period which is then started.

Figure 3:
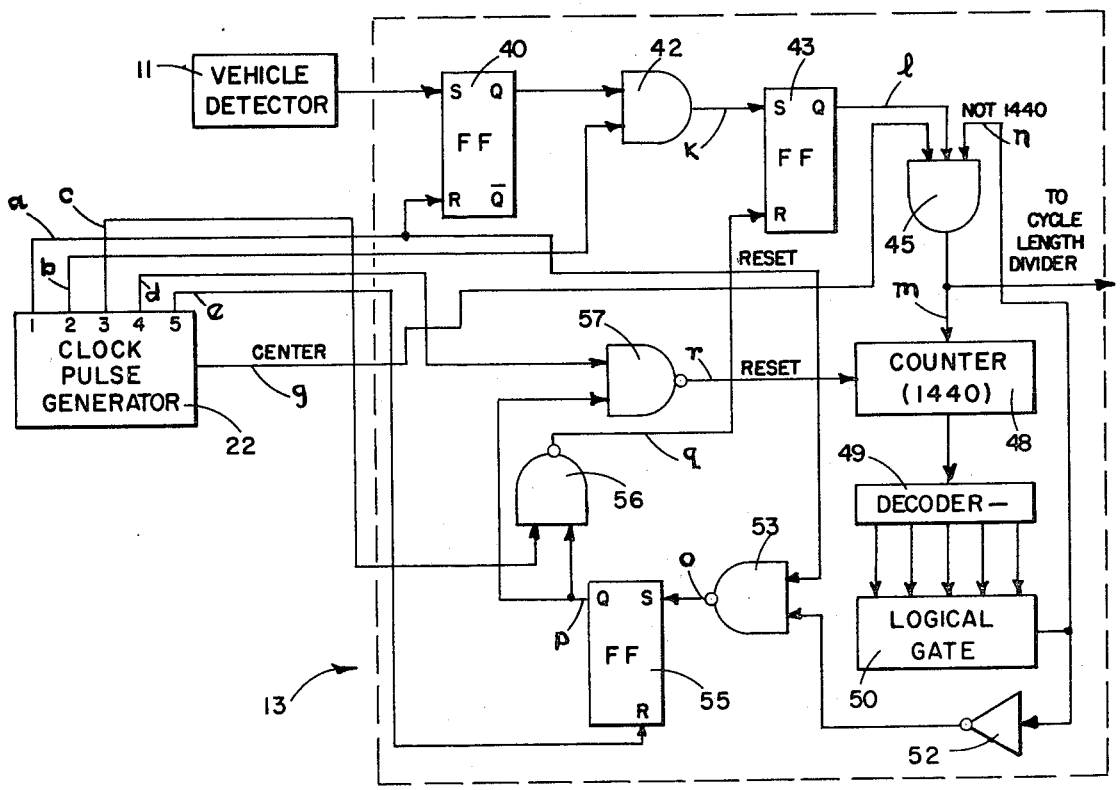
FIG. 3 is a functional block diagram of scaling multiplier circuits which may be used in the system of the invention.
Figure 2:
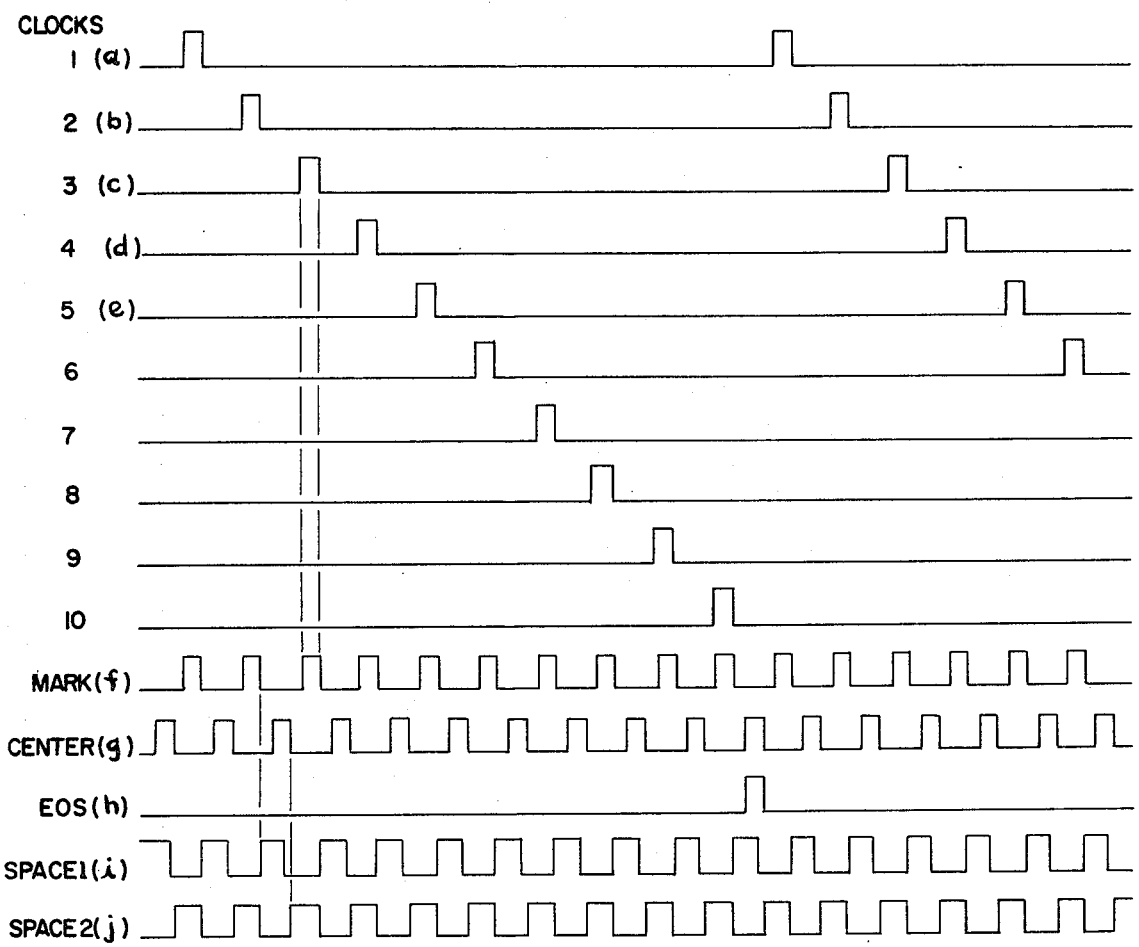
FIG. 2 is a drawing illustrating waveforms of clock signals which may be used in implementing the system of the invention.
Figure 4:
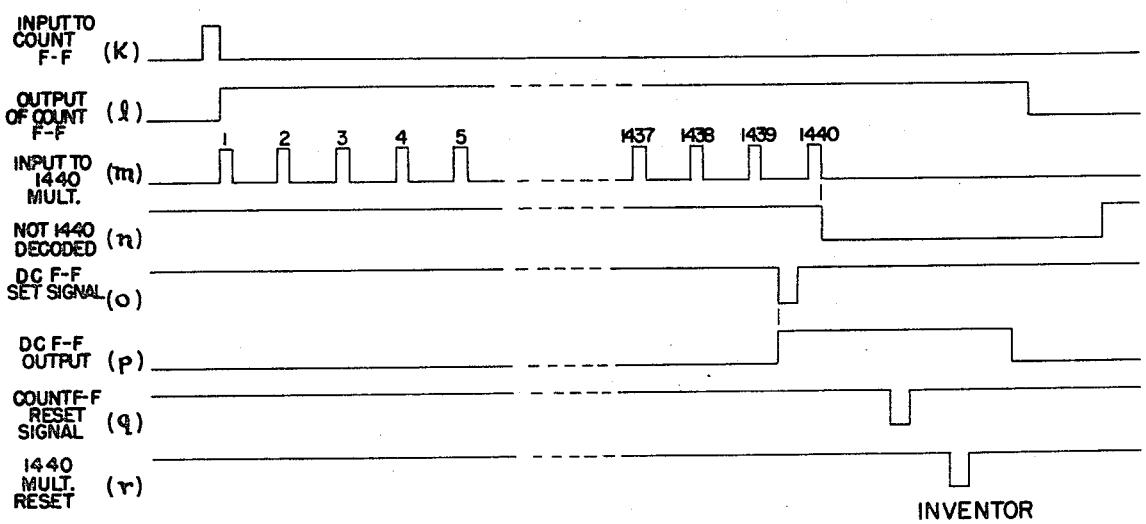
FIG. 4 is a drawing illustrating waveforms generated in the circuits of FIG. 3.

Referring now to FIGS. 2-4, scaling multiplier circuits which may be utilized in the system of the invention and waveforms associated therewith are illustrated. It is to be noted that FIG. 2 shows the various systems clock and synchronization pulses that are utilized to synchronize the operation of the various circuits in proper time relationship, these signals being developed in the clock generator and circuits associated therewith. For convenience of illustration, the various waveforms have been designated with small letters which are indicated in the circuit diagrams.

The output of vehicle detector 11, which may comprise a pulse, is fed to the set input of flipflop 40. This provides an enabling signal from filpflop 40. This provides an enabling signal from flip-flop 40 to AND gate 42. With AND gate 42 thus enabled, the next clock-2 pulse (b) which is fed to the AND gate will be passed therethrough as a set signal (k) for flipflop 43. Flipflop 43 is thus driven to the set state, and its output (1) is fed as an enabling signal to AND gate 45. It is to be noted at this point that with the arrival of the next clock-1 pulse, that flipflop 40 is reset by such pulse so that it is prepared to receive a succeeding actuation from vehicle detector 11.

Gate 45 also receives an enabling signal from logical circuit 50 when counter 48, which may comprise a binary counter, has not reached the predesired count (in the illustrative example, 1440). With both enabling signals present, AND gate 45 passes center pulses (g) therethrough to counter 48, which counts up these pulses (m) until the counter reaches this count, whereupon a signal from counter decoder 49 which reflects this count causes logical circuit 50 to provide an inhibiting signal (n) to gate 45. Thus, as can be seen in FIG. 4 (m), exactly 1440 pulses are fed to counter 48 for each actuation signal received from vehicle detector 11. These pulses are fed to the cycle length divider illustrated in FIG. 5. With the attainment of the maximum count (1440), a signal is also fed from logical circuit 50 to inverter 52 from which an enabling signal is provided to NAND gate 53. NAND gate 53 also receives the clock-1 pulse (a) which is passed therethrough to provide a set signal for flipflop 55. The output of flipflop 55 (p) in turn provides an enabling signal for NAND gates 56 and 57. The clock-3 pulse (c) is thus passed through gate 56 to provide a reset signal (q) for flipflop 43, while the next clock-4 (d) is passed through gate 57 to provide a reset signal (r) for counter 48 to prepare this flipflop and the counter for a new sample cycle.

Figure 5:
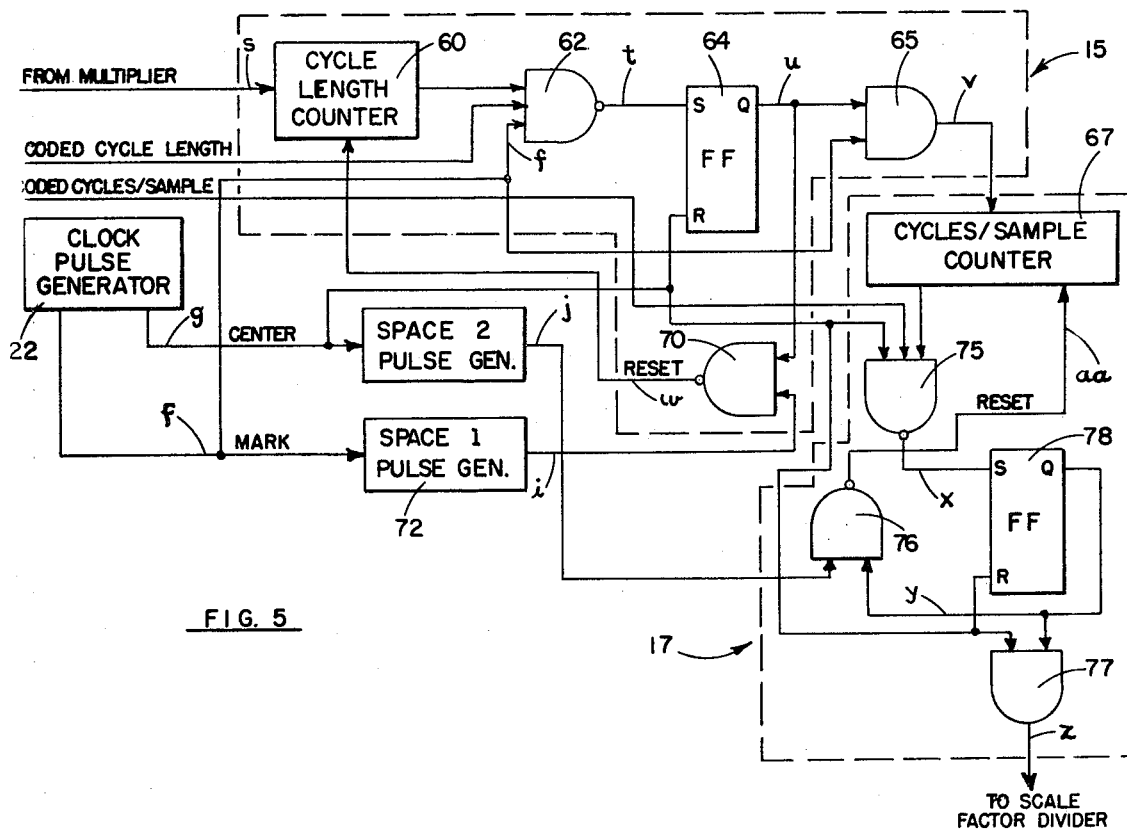
FIG. 5 is a functional block diagram of circuitry which may be used for the cycle length and cycles/sample dividers in the system of the invention.
Figure 6:
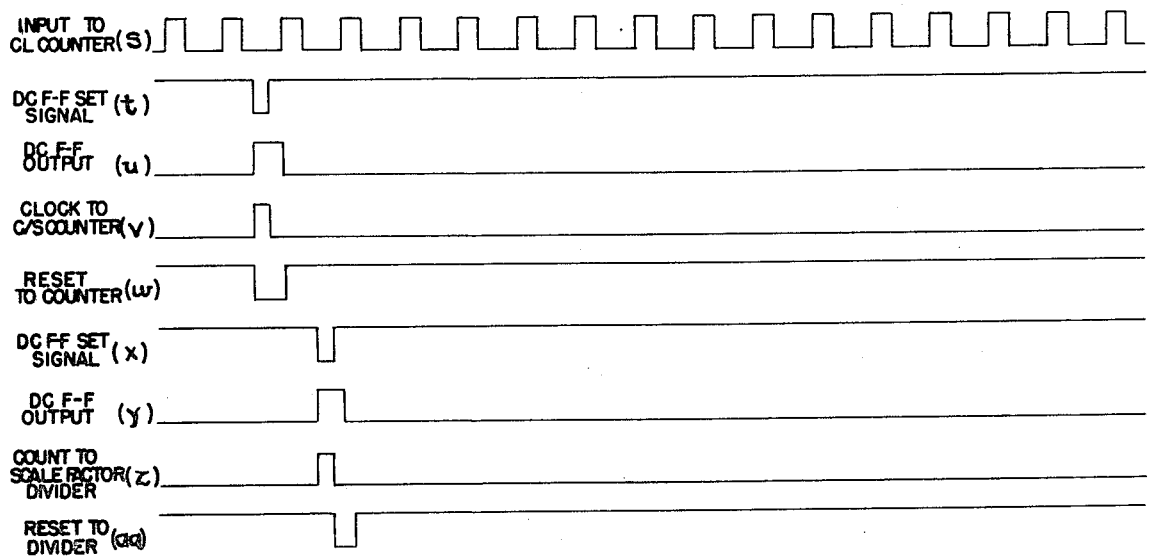
FIG. 6 illustrates waveforms generated in the circuitry of FIG. 5.

Referring now to FIGS. 5 and 6, circuitry which may be utilized in the cycle length divider and the cycles/sample divider along with waveforms pertinent thereto are respectively illustrated. The signals from the multiplier circuits (s) are fed to cycle length counter 60 which may comprise a binary counter. The signal in accordance with the count in the counter is fed to NAND gate 62. Also fed to NAND gate 62 are mark pulses (f) and a coded cycle length signal indicative of a preselected cycle length. When the coded cycle length signal and the output of cycle-length counter 60 are in coincidence, gate 62 is enabled and in response to a mark pulse provides a pulse (t) so as to set flipflop 64. The output of flipflop 64 (u) provides an enabling signal for AND gate 65, enabling this gate to pass a mark pulse (v) therethrough to cycles/sample counter 67. The output (u) of flipflop 64 also provides an enabling signal to NAND gate 70. This gate receives the output (i) of space-1 pulse generator 72 which is synchronized with the trailing edge of the mark pulses (f). Thus, with the arrival of the space-1 generator pulse immediately after the mark pulse, a signal (w) appears at the output of NAND gate 70, this signal being used to reset cycle length counter 60 so that it is ready for another count cycle. In this manner, the coded cycle length signal is effectively compared with the output of the cycle length counter such that the signal received from the multiplier is divided in accordance with the coded cycle length. It is to be noted that flipflop 64 is reset immediately after cycle length counter 60 is reset by a center pulse (g).

Cycles/sample divider 17, which includes counter 67, gate 75–77 and flipflop 78, operates in exactly the same manner as the cycle length divider 15 to further divide the signal in accordance with the preselected number of cycles per sample. Thus, the output of cycles/sample counter is fed to NAND gate 75 which also receives a coded signal in accordance with the number of cycles per sample, such that when coincidence is reached between the output of the counter and the coded signal, a center pulse (g) is fed through the gate to provide a set signal (x) for flipflop 78. The output (y) of flipflop 78 provides an enabling signal for AND gate 77 which thus passes a center pulse therethrough (z) which is fed to the scale factor divider. Counter 67 is reset by signal (aa) generated in response to the space-2 pulse generator signal (j) which is fed to NAND gate 76, this gate being enabled by the output (y) of the flipflop. As can be seen in FIG. 2, the space-2 signals are synchronized with the trailing edge of the center pulses and thus the reset pulse (aa) occurs immediately after the pulse (z) to the scale factor divider appears. With the resetting of counter 67 the set signal to flipflop 78 disappears and the next center pulse (g) thereto resets this flipflop to provide an inhibit signal to gate 77.

Figure 7:
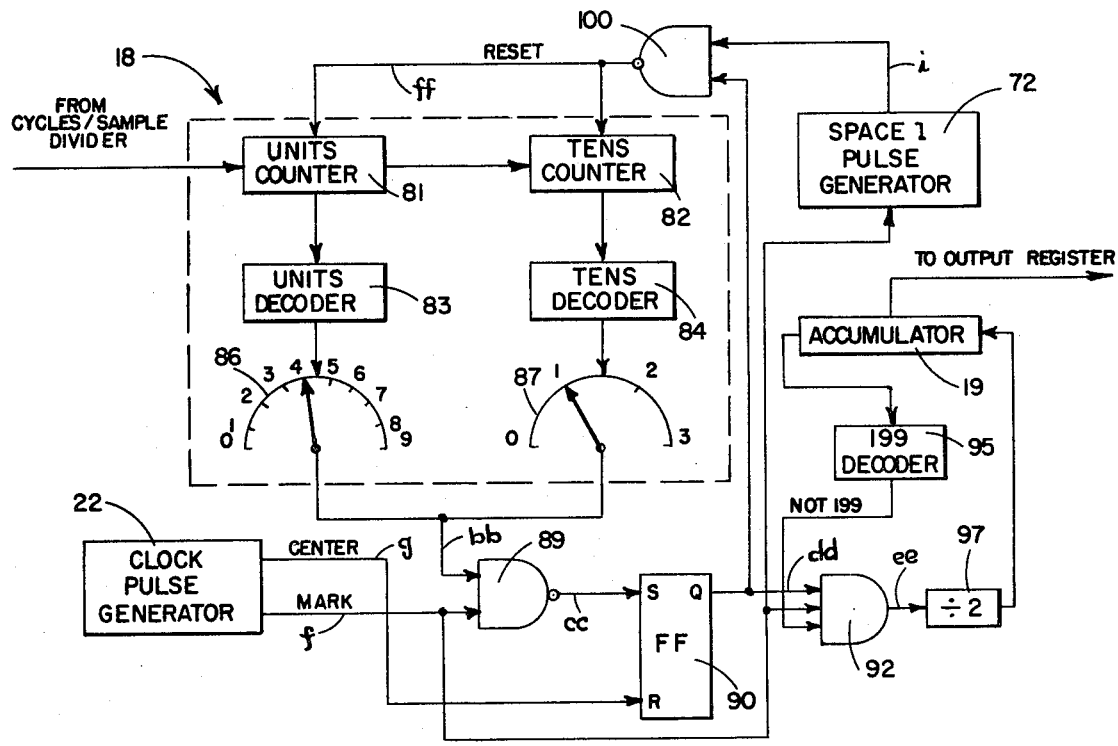
FIG. 7 is a functional block diagram of a scale factor divider and associated circuitry which may be utilized in the system of the invention.
Figure 8:
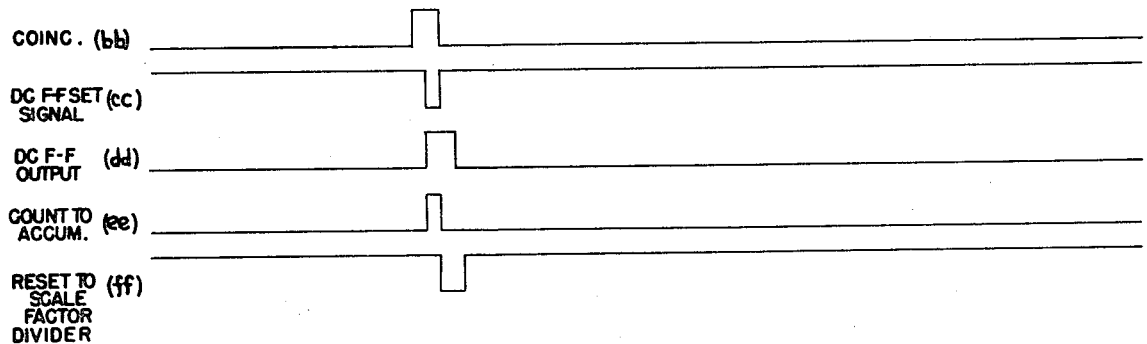
FIG. 8 illustrates waveforms generated in the circuitry of FIG. 7.

Referring now to FIGS. 7 and 8, a functional block diagram of a scale factor divider and associated circuitry and waveforms generated in connection therewith are respectively illustrated. The output of the cycles/sample divider is fed to units counter 81, the output of which in turn is fed to tens counter 82. Units counter 81 counts 9 counts and then shifts to zero on the tenth count, every such tenth count being fed to the tens counter. The outputs of the units and tens counters are fed to units and tens decoders 83 and 84 respectively, where the signals are decoded to decimal form. Selector switches 86 and 87 are utilized to select predetermined outputs of the units and tens decoders respectively, these selected outputs representing the scale factor to be used in computing the percentage volume measurements. When the selected count set on selector switches 86 and 87 is reached, a coincidence pulse (bb) is fed to NAND gate 89. Typically, the settings on switches 86 and 87 may be used to represent vehicles per hour times 100. Thus, with the switches set as indicated in FIG. 7, i.e., the ten switch at 1 and the one switch at 4, the reference volume is 1400 vehicles per hour.

With coincidence signal (bb) enabling gate 89, a mark pulse (f) will be passed through the gate to provide a set signal (cc) for flipflop 90. The output (dd) of flipflop 90 is fed as an enabling signal to AND gate 92. This AND gate also receives a signal from "199" decoder 95, this decoder operating in response to the accumulated count in accumulator 19. When the accumulated count (as received by divider 97) has not reached "199," decoder 95 provides an enabling signal to gate 92. Thus, with both enabling signals present, a mark pulse is passed through the gate. The output (ee) of gate 92 is divided by two by means of divider 97, and the divided signal fed to accumulator 19. The output of flipflop 90 is also fed to NAND gate 100 to provide an enabling signal therefor. This gate also receives a signal (i) from space-1 pulse generator 72, which as already noted is synchronized with the trailing edge of the mark pulse. This signal thus provides a reset signal (ff) for the units and tens counters 81 and 82. It is to be noted that the divide-by-two factor afforded by means of divider 97 is used to provide ½% accuracy, it thus taking 200 pulses to the divider to cause the accumulator 19 to count up to 100. The next succeeding center pulse (g) resets flipflop 90 so that it is ready for the next input.

If the accumulated count should reach "199," the 199 decoder 95 will cease providing a "Not 199" signal to gate 92, thus inhibiting the gate. Thus the gate will no longer pass mark pulses therethrough. The further accumulation of counts in the accumulator will therefore be terminated. In this manner, accurate percentage readings can be obtained up to 198 percent.

It thus should be apparent that an input is provided to accumulator 19 which represents the ratio between the number of vehicles arriving during the sampling period and the standard or reference selected by means of switches 86 and 87. In view of the fact that accumulator 19 has a 199 count, the count on the accumulator during the sampling period is equal to this computed ratio in percentage form up to 198% of the reference volume.

Figure 9:
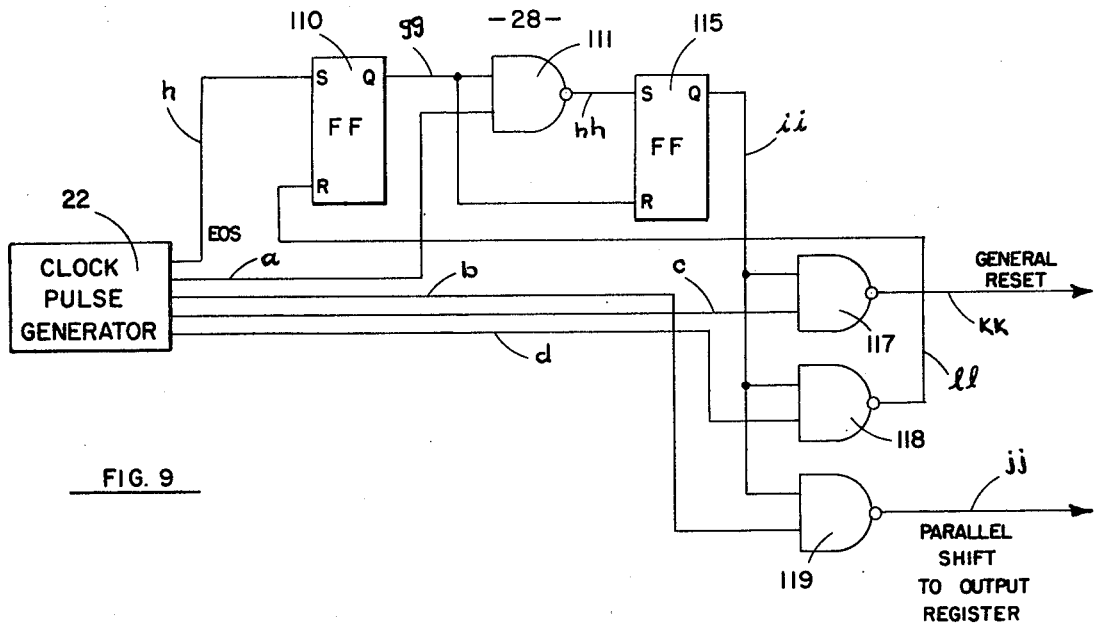
FIG. 9 is a functional block diagram illustrating gating circuitry which may be used to implement the functions at the end of a sampling period.
Figure 10:
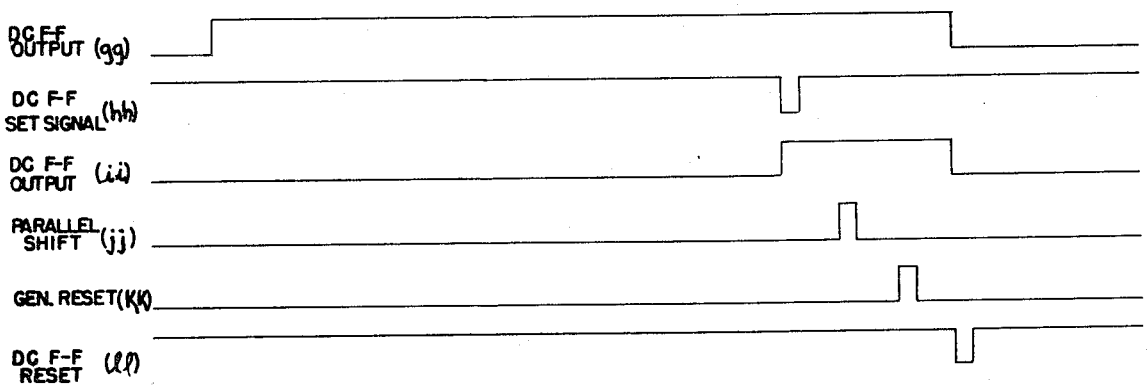
FIG. 10 illustrates waveforms generated in the circuitry of FIG. 9.

Referring now to FIGS. 9 and 10, a functional block diagram illustrating gating circuitry which may be used to implement the functions at the end of a sampling period and waveforms generated in connection therewith are respectively illustrated. When a sampling period has been completed, an end of sampling pulse (h) is generated between a clock 10 and clock 1 by clock pulse generator 22. This signal is fed as a set signal to flipflop 110. The output (gg) of flipflop 110 provides an enabling signal to NAND gate 111. This gate also receives the clock-1 pulse (a), this pulse providing a set signal (hh) for flipflop 115. The output (ii) of flipflop 115 provides an enabling signal to NAND gates 117–119. Clock-2 (b) thus operates to provide a parallel shift signal (jj) from gate 119 to the output register. Clock-3 (c) is then fed to gate 117 to provide a general reset signal (kk) to all the dividers and the multiplier. Clock-4 (d) is then fed to gate 118 to provide a reset signal (ll) for flipflop 110 which with resetting in turn resets flipflop 115. Thus, at the end of each predetermined sampling period, the information is read out to display and computing circuits and the system is reset for commencement of a new sampling period.

The system of this invention thus provides a highly accurate and reliable means for obtaining successive updated computations of traffic volume in terms of a percentage of a preselected standard volume.

While the system of this invention has been described and illustrated in detail, it is to be clearly understood that this is intended by way of illustration and example only and is not to be taken by way of limitation, the spirit and scope of the invention being limited only by the terms of the following claims.

I claim:

1. In a system for computing the volume of traffic at a location along a roadway, said system including detector means for generating a digital signal for each vehicle passing said location and means responsive to said detector means for generating a digital signal in accordance with the volume of vehicles passing said location during a predetermined sampling period, the improvement comprising:
   selector switch means for selecting a factor representing reference volume,
   means for dividing the volume signal by the selected reference volume factor to produce a digital signal in accordance with the ratio therebetween, and
   means for providing a readout of said ratio signal.

2. The system of claim 1 wherein said means for providing a readout signal comprises a predetermined count accumulator for accumulating said digital signal in accordance with ratio, the output of said accumulator representing said ratio as a percentage.

3. The system of claim 2 and further comprising means for terminating the digital input to said accumulator when said predetermined count has been reached.

4. The system of claim 2 wherein said means for providing a readout signal further includes an output register for receiving the output of said accumulator, and gating means for gating out the signal on said register.

6. The system of claim 5 wherein said selector switch means comprises a selector switch connected to each of said decoding means for selecting desired outputs thereof.

5. The system of claim 1 wherein said means for dividing the volume signal comprises a units and tens divider and means for decoding the outputs of said dividers to decimal form.

7. The system of claim 1 wherein is included clock pulse generator means for generating a series of clock pulses for controlling the functions of said system in an ordered sequence and defining the end of each sampling period, predetermined ones of said clock pulses being respectively fed to said selecting means, said dividing means and said readout providing means.

8. A system for providing continuous successive readouts of the vehicle traffic volume at a location along a roadway comprising:
   detector means for providing a digital signal in accordance with the number of vehicles passing said location;
   means for multiplying said signal in accordance with the number of vehicles by a predetermined factor;
   cycle length divider means for dividing the multiplied signal by a factor in accordance with a predetermined sample cycle length;
   cycles/sample divider means for dividing the output of said cycle length divider means by a factor in accordance with the predetermined number of cycles in each sampling period;
   selectable scale factor divider means for dividing the output of said cycles/sample divider means by a preselected scale factor which represents a standard of reference vehicle volume per unit of time, the output of said scale factor divider means indicating the volume of traffic per unit of time as a proportion of the selected reference volume;
   accumulator means for digitally accumulating the output of said scale factor divider means; and
   means for reading out the signal accumulated in said accumulator means during successive predetermined sampling periods.

9. The system of claim 8 wherein said pre-determined multiplying factor is 1440.

10. The system of claim 8 wherein said scale factor divider comprises a units counter and a tens counter, means for decoding the outputs of each of said counters to decimal form, switch means for selecting decoded outputs of said counters, and means responsive to the output of said switch means for resetting said counters when the selected count has been reached.

11. The system of claim 8 wherein said accumulator means has a predetermined count, the output thereof representing the vehicle volume as a percentage of the reference volume.

12. The system of claim 11 and further comprising means for terminating the digital input to said accumulator when said predetermined count has been reached.

13. The system of claim 8 wherein is included clock pulse generator means for generating a series of clock pulses for controlling the functions of said system in an ordered sequence and signaling the end of each sampling period, predetermined ones of said clock pulses being respectively fed to said multiplying means, said cycle length divider means, said cycles/sample divider means, said scale factor divider means and said accumulator means.

* * * * *